(12) United States Patent
Jamison et al.

(10) Patent No.: US 9,638,360 B2
(45) Date of Patent: May 2, 2017

(54) LEAK DETECTION O-RING

(71) Applicant: Mueller Industries, Inc., Memphis, TN (US)

(72) Inventors: Tommy L. Jamison, Hernando, MS (US); Charles A. Stout, Cordova, TN (US); Adam L. Thomas, Atoka, TN (US)

(73) Assignee: Mueller Industries, Inc., Memphis, TN (US)

( * ) Notice: Subject to any disclaimer, the term of this patent is extended or adjusted under 35 U.S.C. 154(b) by 409 days.

(21) Appl. No.: 13/764,978

(22) Filed: Feb. 12, 2013

(65) Prior Publication Data

US 2013/0207386 A1    Aug. 15, 2013

Related U.S. Application Data

(60) Provisional application No. 61/598,504, filed on Feb. 14, 2012.

(51) Int. Cl.
*F16L 13/14* (2006.01)
*F16J 15/10* (2006.01)

(52) U.S. Cl.
CPC .............. *F16L 13/141* (2013.01); *F16J 15/10* (2013.01); *F16L 13/142* (2013.01); *F16L 13/148* (2013.01)

(58) Field of Classification Search
CPC ..... F16L 13/141; F16L 13/142; F16L 13/148; F16L 17/025; F16L 17/02; F16L 17/067; F16L 17/06; F16J 15/00; F16J 15/022; F16J 15/10

USPC ........ 285/382, 918, 351, 256; 277/616, 612, 277/626, 609, 630, 637, 644

See application file for complete search history.

(56) References Cited

U.S. PATENT DOCUMENTS

| | | | |
|---|---|---|---|
| 3,244,441 A * | 4/1966 | Caudle ........................ | 285/374 |
| 2008/0185247 A1 * | 8/2008 | Kim ........................ | 188/322.16 |
| 2010/0025992 A1 * | 2/2010 | Spence ................ | F16L 13/142 |
| | | | 285/379 |

FOREIGN PATENT DOCUMENTS

| | | |
|---|---|---|
| DE | 10118956 C1 | 6/2002 |
| DE | 10303296 B3 | 7/2004 |
| DE | 202006004457 U1 | 5/2006 |
| EP | 2151616 A2 | 2/2010 |

OTHER PUBLICATIONS

International Search Report for EP 13155232 dated May 13, 2013.
(Continued)

*Primary Examiner* — Gregory Binda
*Assistant Examiner* — Zachary Dragicevich
(74) *Attorney, Agent, or Firm* — Harness, Dickey & Pierce, P.L.C.

(57) ABSTRACT

A seal member for sealingly securing a first and a second pipe at a crimp connection, the seal member including a ring-shaped body having an outer diameter and an inner diameter. A plurality of protrusions are formed on the ring-shaped body and extend radially outwardly from the outer diameter. The ring-shaped body permits fluid to pass around adjacent protrusions prior to attaining the crimp connection and inhibits fluid from passing therearound subsequent to attaining the crimp connection.

20 Claims, 4 Drawing Sheets

(56) References Cited

OTHER PUBLICATIONS

Written Opinion for EP 13155232 dated May 13, 2013.
International Search Report and Written Opinion for EP 13155232 mailed May 7, 2013.
Whitlock, Jerry. The Seal Man's O-Ring Handbook., 2004, pp. 22-23, EPM, Inc., United States.

* cited by examiner

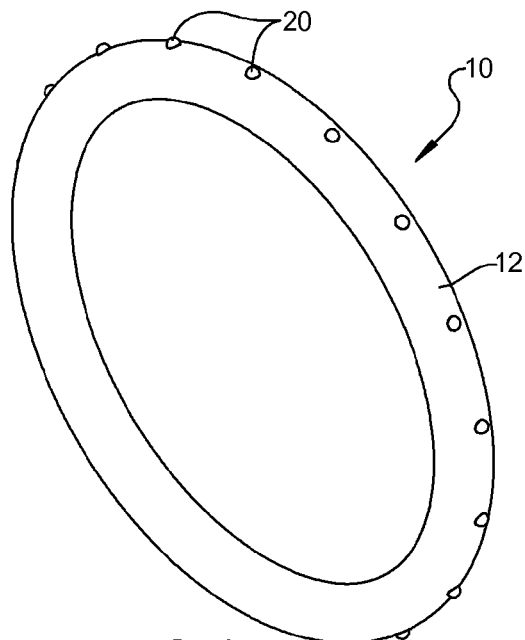
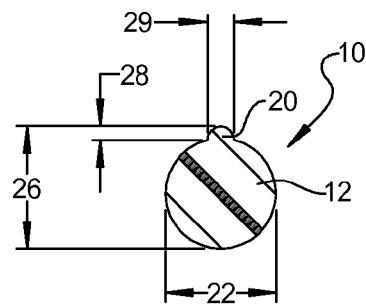
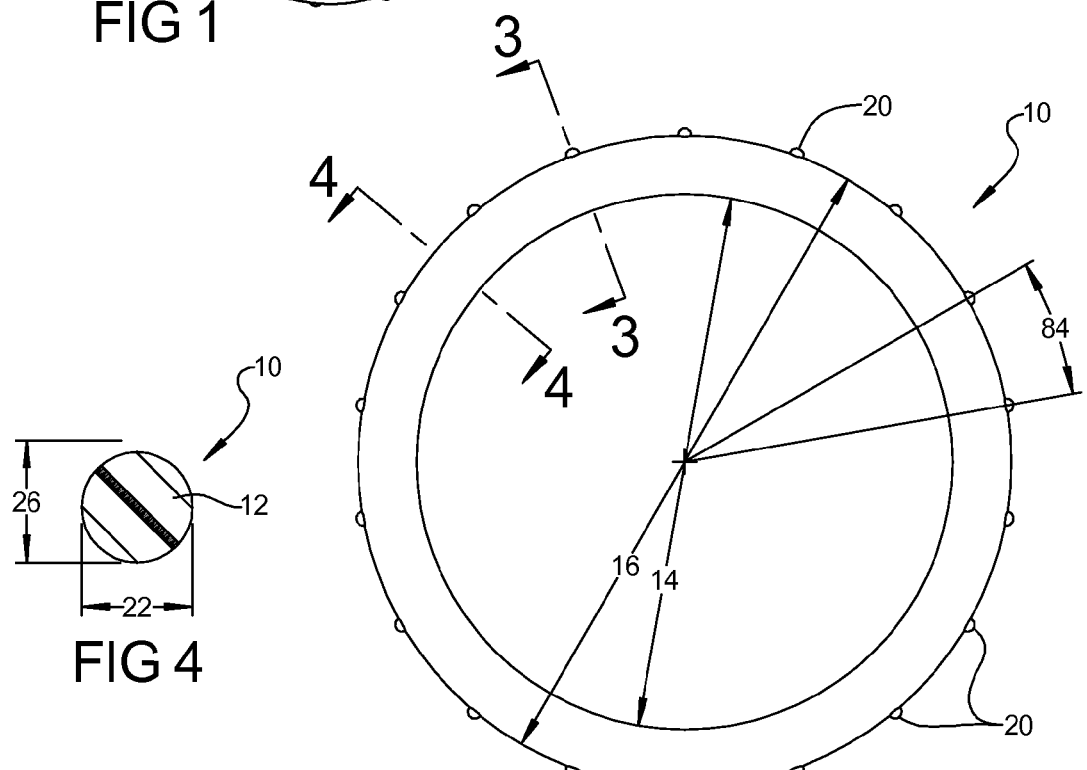

LEAK DETECTION O-RING

CROSS-REFERENCE TO RELATED APPLICATIONS

This application claims the benefit of U.S. Provisional Application No. 61/598,504, filed on Feb. 14, 2012. The entire disclosure of the above application is incorporated herein by reference.

FIELD

The present disclosure relates generally to sealing arrangements configured for use between pipes in a fluid delivery system, and more particularly to a sealing arrangement provided in a crimp connection between corresponding pipes.

BACKGROUND

This section provides background information related to the present disclosure which is not necessarily prior art.

There has long been a need for joining two components in a manner that fixedly and sealingly couples the components to one another. In one configuration, a pipe assembly can incorporate an outer pipe that receives an inner pipe. The outer pipe can incorporate an annular groove that receives a seal or O-ring. When the annular groove is crimped, the O-ring provides a crimp joint with the inner and outer pipes creating a fluid-tight seal between the pipes. In some instances, an installer may insufficiently crimp a crimp joint or may inadvertently omit the crimping of a particular joint entirely. Sometimes such pipe assemblies that include uncrimped joints may initially pass a pressure test but may leak over time.

SUMMARY

This section provides a general summary of the disclosure, and is not a comprehensive disclosure of its full scope or all of its features.

In one form, the present teachings provide a seal member for sealingly securing a first and a second pipe at a crimp connection. The seal member includes a ring-shaped body having an outer diameter and an inner diameter. A plurality of protrusions are formed on the ring-shaped body and extend radially outwardly from the outer diameter. The ring-shaped body permits fluid to pass around adjacent protrusions prior to attaining the crimp connection and inhibits fluid from passing therearound subsequent to attaining the crimp connection.

According to additional features, the inner diameter of the seal member defines a consistent radius. The plurality of protrusions may be generally hemispherically shaped. In one example, the plurality of protrusions are equally spaced around the outer diameter of the ring-shaped body. In other features, the plurality of protrusions are generally trapezoidal in axial cross-section.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a front perspective view of an exemplary seal member constructed in accordance with one example of the present teachings;

FIG. 2 is a plan view of the seal member of FIG. 1;

FIG. 3 is a cross-sectional view of the seal member taken along lines 3-3 of FIG. 2;

FIG. 4 is a cross-sectional view of the seal member taken along lines 4-4 of FIG. 2;

Corresponding reference numerals indicate corresponding parts throughout the several views of the drawings.

DETAILED DESCRIPTION

Figure 5:
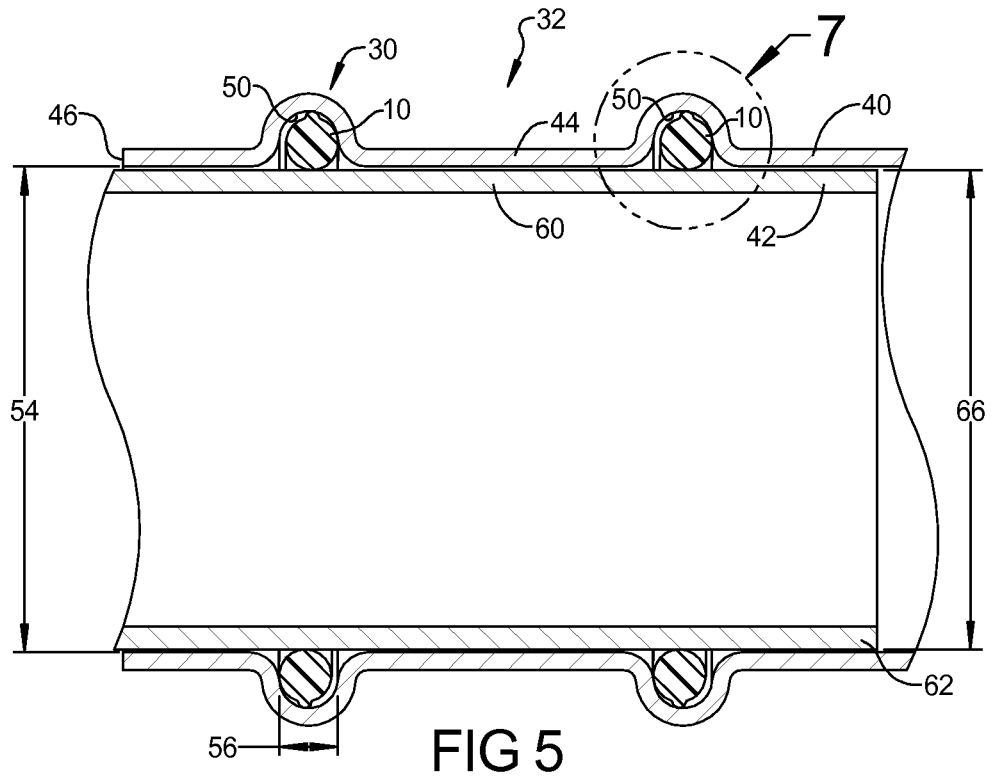
FIG. 5 is a cross-sectional view of an exemplary outer pipe having an inner annular groove configured to receive the seal member of FIG. 1 therein, the outer pipe shown receiving an inner pipe and prior to crimping.

Example embodiments will now be described more fully with reference to the accompanying drawings.

With initial reference to FIGS. 1-4, a seal member constructed in accordance with one example of the present teachings is shown and generally identified at reference numeral 10. As will be described more fully herein, the seal member 10 is particularly suitable for use in a crimp fitting between concentric pipes in a pipe fitting assembly. The seal member 10 is generally in the form of an O-ring and includes a ring-shaped body 12. The ring-shaped body 12 generally includes an inner diameter 14 and an outer diameter 16 (FIG. 2).

A plurality of protrusions 20 are formed on the ring-shaped body 12 and extend radially outwardly from the outer diameter 16. In the example shown, the plurality of protrusions 20 are generally hemispherical in geometry and are in the shape of nubs that project outwardly from the outer diameter 16. By way of example, the seal member 10 incorporates eighteen protrusions around the outer diameter 16. In the example provided, a protrusion 20 is provided on the ring-shaped body 12 at equally spaced intervals of about 20 degrees. It will be appreciated however that additional or fewer protrusions 20 may be formed on the seal member 10 at various regular or irregular intervals within the scope of this disclosure. Moreover, while the protrusions 20 are shown generally in the form of nubs, other geometrical shapes are contemplated. In the particular example shown, the seal member 10 may be formed of an elastomeric material.

With particular reference to FIGS. 3 and 4, the ring-shaped body 12 of the seal member 10 includes an axial cross-section 22 and a radial cross-section 26 taken through a protrusion 20. Each protrusion 20 can include a radial height 28 and an axial cross-section 29. By way of example and not limitation, a nominal one inch O-ring seal member of FIGS. 1 through 4 of the present invention can have an outer diameter of approximately 1.369 inches, an axial cross-section 22 of approximately 0.124 inches, a radial cross-section 26 of approximately 0.139 inches, a radial height 28 of the protrusion 20 of approximately 0.015 inches, and an axial cross-section 29 of approximately 0.030 inches. A ratio of the radial height 28 of the protrusion 20 and the radial cross-section 26 is approximately 0.108. Further, the example seal member 10 has approximately eighteen protrusions 20 equally spaced along its circumference at approximately every 0.237 inches. It will be appreciated, however, that these dimensions are merely exemplary, have tolerances, and may be changed to accommodate any particular application. In this regard, other dimensions may be employed within the scope of this disclosure.

With continued reference to FIG. 2 and additional reference now to FIGS. 5 and 6, additional features of the present disclosure will be described. As noted above, the seal member 10 according to the present disclosure is particularly suitable for use in a crimp fitting 30 of a pipe fitting assembly 32. The exemplary pipe fitting assembly 32 comprises a first pipe fitting or outer pipe 40 and a second pipe fitting or inner pipe 42. The outer pipe 40 includes an outer pipe body 44 that defines an open receiving end 46. The outer pipe 40 further includes an inner annular groove 50 formed at a location axially spaced from the open receiving end 46. In the example shown, two annular grooves 50 are provided that each receive a seal member 10. The outer pipe 40 has an inner diameter 54. The inner annular groove 50 has an axial length 56.

The inner pipe 42 generally includes an inner pipe body 60 having an insertion end 62. The inner pipe 42 has an outer diameter 66. In general, the inner diameter 54 of the outer pipe 40 is configured to slidably accept the outer diameter 66 of the inner pipe 42. Similarly, the inner annular groove 50 is dimensioned to have an axial length 56 that accommodates the seal member 10 therein. In particular, the seal member 10 may be dimensioned to be nestingly accommodated by the annular groove 50 of the outer pipe 40.

Figure 7:
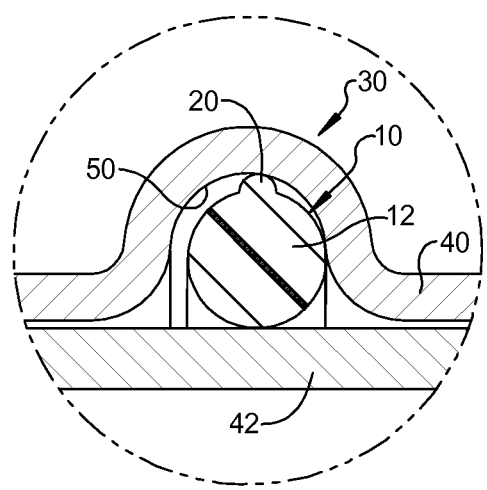
FIG. 7 is an enlarged view of the circled area 7 of FIG. 5.

As illustrated in FIG. 5 and FIG. 7, the crimp fitting 30 of the pipe fitting assembly 32 is shown in an uncrimped position. Explained further, the inner annular groove 50 has yet to be radially collapsed toward the inner pipe 42. In the uncrimped position, fluid is permitted to generally flow around the inner annular groove 50 of the outer pipe 40 between adjacent protrusions 20. Advantageously, an installer or user will be aware that the crimp fitting 30 has yet to be sufficiently crimped through observation of fluid passing generally between the inner diameter 54 of the outer pipe 40 and the outer diameter 66 of the inner pipe 42.

Of note, the configuration of the seal member 10 is particularly advantageous in a crimp fitting application as the inner diameter 14 provides a consistent radius. Explained further, the inner diameter 14 of the ring-shaped body 12 is free from protrusions, discontinuities or other geometries that may otherwise interrupt the consistent inner radial surface of the seal member 10. In this regard, when the seal member 10 is initially located into the inner annular groove 50 of the outer pipe 40, and the insertion end 62 of the inner pipe 42 is progressively advanced into the open receiving end 46 of the outer pipe 40 as shown in FIG. 7, the insertion end 62 is uninhibited from further advancing into the outer pipe 40 such as by protrusions or other geometries extending inwardly from the seal member 10. Explained differently, the inner diameter 14 of the seal member 10 does not have any protrusions or discontinuities that may catch on the insertion end 62 of the inner pipe 42 during slidable advancement of the inner pipe 42 into the outer pipe 40.

Figure 6:
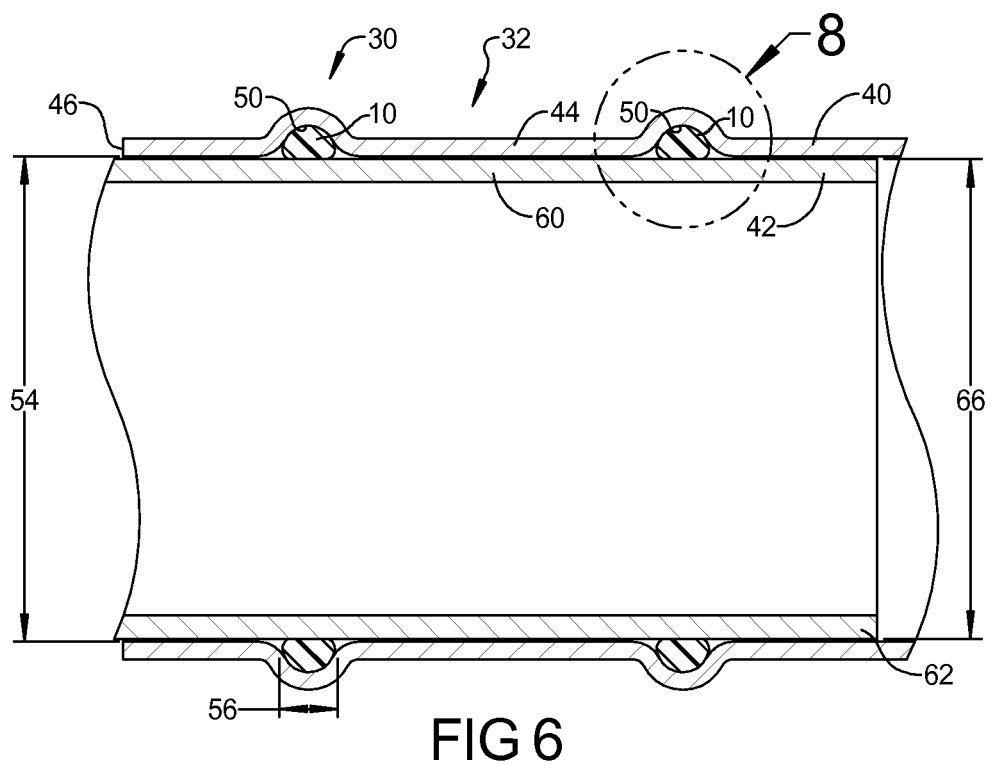
FIG. 6 is a cross-sectional view of the assembly of FIG. 5 shown subsequent to crimping.
Figure 8:
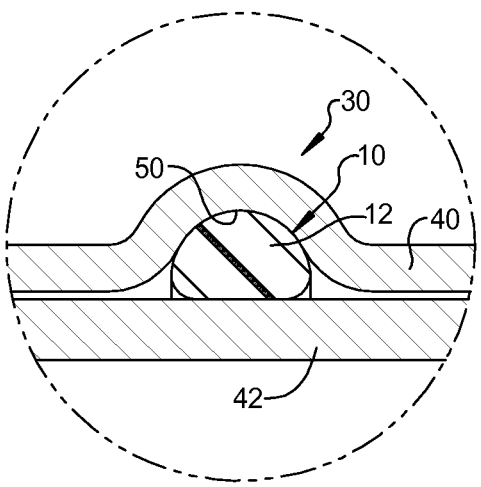
FIG. 8 is an enlarged view of the circled area 8 of FIG. 5.

With particular reference to FIG. 6 and FIG. 8, the crimp fitting 30 is shown in a crimped position where the inner annular groove 50 has been radially deflected toward the inner pipe 42. In this regard, the seal member 10 is at least partially compressed between the outer and inner pipes 40 and 42, respectively, at the inner annular groove 50. In the crimped position, fluid is inhibited from flowing around the seal member 10. Explained further, in the crimped position, the protrusions 20 of the seal member 10 are compressed to essentially have the same diameter as the remainder of the seal member 10.

Figure 9:
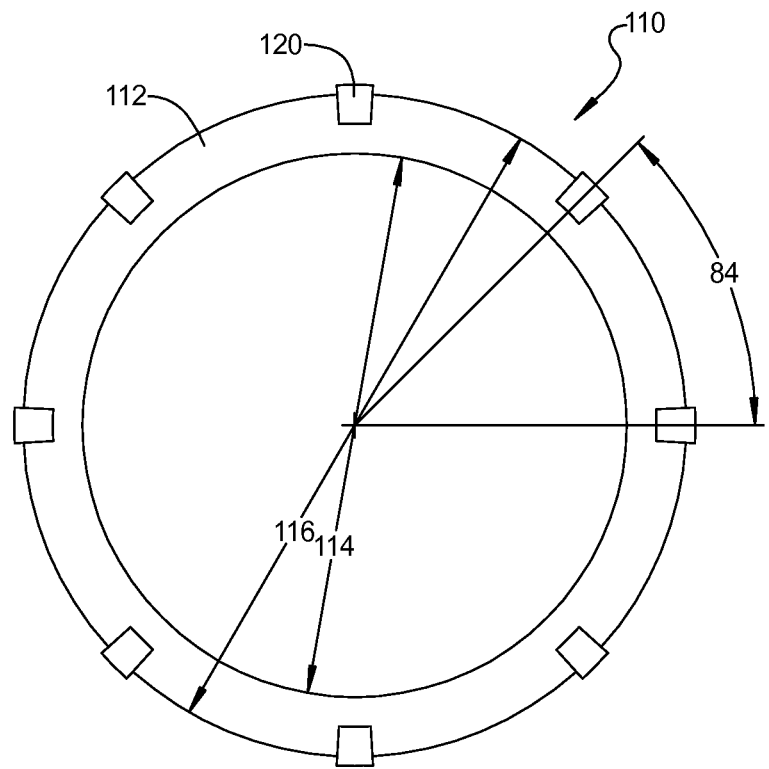
FIG. 9 is a plan view of a seal member constructed in accordance with another example of the present disclosure.

Turning now to FIG. 9, a seal member 110 constructed in accordance with another example of the present disclosure is shown. The seal member 110 is generally in the form of an O-ring and includes a ring-shaped body 112. The ring-shaped body 112 includes an inner diameter 114 and an outer diameter 116. A plurality of protrusions 120 are formed on the outer diameter 116 and project radially outwardly therefrom. The protrusions 120 are generally trapezoidal in axial cross-section as shown in FIG. 9. In the example provided, eight protrusions 120 are incorporated around the ring-shaped body 112 at equally spaced intervals of approximately 45 degrees. It is contemplated, however, that other amounts and regular and irregular spacing may be incorporated. As with the seal member 10, the inner diameter 114 of the seal member 110 includes a consistent radius. The seal member 110 can generally function similar to the seal member 10 described above. In this regard, the seal member 110 can be incorporated as part of a crimp fitting such that fluid is permitted to generally flow between adjacent protrusions 120 in an uncrimped position. The seal 110 can further inhibit fluid from passing therearound in a crimped position similar to that shown and described above with respect to FIG. 6.

Figure 10:
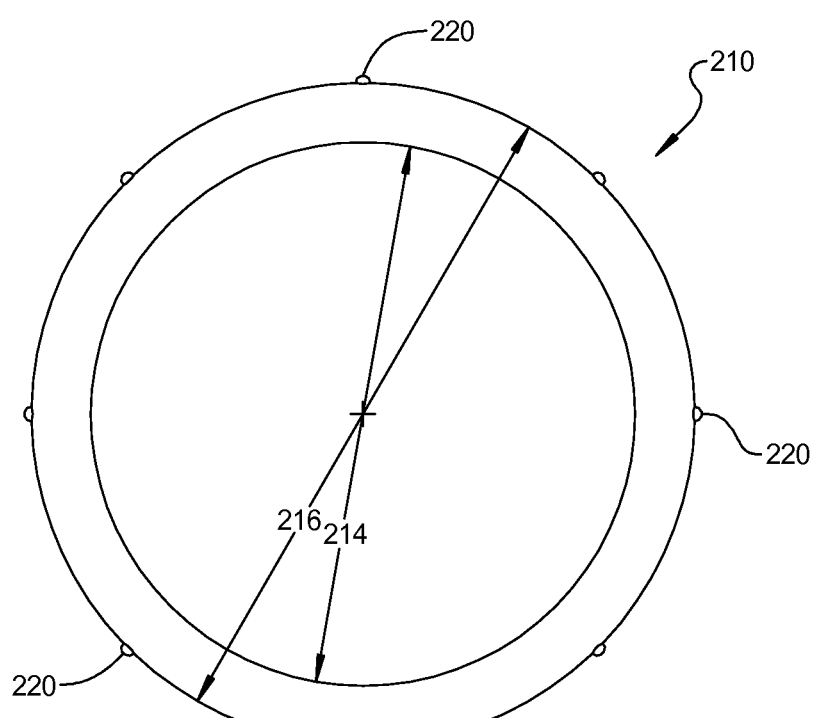
FIG. 10 is a plan view of a seal member constructed in accordance with a further example of the present disclosure.

Turning now to FIG. 10, a seal member 210 constructed in accordance with another example of the present disclosure is shown. The seal member 210 is generally in the form of an O-ring and includes a ring-shaped body 212. The ring-shaped body 212 includes an inner diameter 214 and an outer diameter 216. A plurality of protrusions 220 are formed on the outer diameter 216 of the ring-shaped body and project radially outwardly therefrom. In the example shown, the plurality of protrusions 220 are generally hemispherical in geometry and are in the shape of nubs that project outwardly from the outer diameter 216, similar to the protrusions 20 in FIG. 2. In the example provided, eight protrusions 220 are incorporated around the ring-shaped body 212 at equally spaced intervals of approximately 45 degrees. It is contemplated, however, that other amounts and regular and irregular spacing may be incorporated. As with the seal member 10, the inner diameter 214 of the seal member 210 includes a consistent radius. The seal member 210 can generally function similar to the seal member 10 described above. In this regard, the seal member 210 can be incorporated as part of a crimp fitting such that fluid is permitted to generally flow between adjacent protrusions 220 in an uncrimped position similar to that shown and described above with respect to FIG. 5. The seal 210 can further inhibit fluid from passing therearound in a crimped position similar to that shown and described above with respect to FIG. 6. While the protrusions in FIG. 10 are shown generally in the form of nubs other geometrical shapes are contemplated. In the particular example shown, the seal member 210 may be formed of an elastomeric material.

With the particular seal member 210, it has been found that in a fitting the eight hemispherical protrusions permit leaking or passing of fluid between the inner diameter 54 of the outer pipe 40 and the outer diameter 66 of the inner pipe 42 at fluid pressures less than 50 psi, but the seal member 210 still maintains adequate strength in the fitting to secure plumbing systems such as outer pipe 40 and inner pipe 42 once engaged but prior to crimping. In this manner, an installer can assemble multiple components of a plumbing system together prior to crimping any of the fitting connections while having sufficient structural integrity of the system to maintain itself in the desired configuration until the necessary crimping is completed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A crimped connection comprising:
a first pipe having a crimp fitting that defines an inner annular groove therein, the crimp fitting having a first position that is not fully crimped and a second position that is fully crimped;
a second pipe having an insertion end configured to be slidably received in the first pipe; and
a seal member disposed within the inner annular groove of the crimp fitting, the seal member having a ring-shaped body and a plurality of protrusions formed on the ring-shaped body, the ring-shaped body having an outer diameter and an inner diameter and the plurality of protrusions extending radially outwardly from the outer diameter, wherein not all of the plurality of protrusions are compressed when the crimp fitting is in the first position to allow fluid to pass through the inner annular groove by flowing between the crimp fitting and the outer diameter of the ring-shaped body and around adjacent protrusions of the plurality of protrusions, and wherein all of the plurality of protrusions are compressed when the crimp fitting is in the second position such that the seal member creates a seal between the crimp fitting of the first pipe and the second pipe that inhibits fluid from passing through the inner annular groove.

2. The crimped connection of claim 1 wherein the inner diameter defines a consistent radius.

3. The crimped connection of claim 2 wherein the plurality of protrusions are generally trapezoidal in axial cross-section.

4. The crimped connection of claim 1 wherein the plurality of protrusions are generally hemispherical.

5. The crimped connection of claim 4 wherein the ring-shaped body has a radial cross-section and a protrusion of the plurality of protrusions has a radial height wherein a ratio of the radial height and the radial cross-section is substantially about 0.108.

6. The crimped connection of claim 1 wherein the plurality of protrusions comprise nubs.

7. The crimped connection of claim 1 wherein the plurality of protrusions are equally spaced around the outer diameter of the ring-shaped body.

8. The crimped connection of claim 1 wherein the plurality of protrusions comprise eight protrusions.

9. The crimped connection of claim 1 wherein the plurality of protrusions comprise eighteen protrusions.

10. The crimped connection of claim 1 wherein the ring-shaped body is formed of elastomeric material.

11. The crimped connection of claim 1 wherein the inner annular groove of the crimp fitting has a first radial height in the first position and a second radial height in the second position that is smaller than the first radial height and wherein the seal member has a radial cross-section that is less than or equal to the first radial height and greater than the second radial height, the radial cross-section of the seal member being measured across both the ring-shaped body and the plurality of protrusions when the plurality of protrusions are not compressed.

12. A crimped connection comprising:
a first pipe defining an open receiving end and having an inner annular groove formed thereon at a location axially spaced from the open receiving end, the first pipe having a first configuration where the first pipe is not fully crimped and a second configuration where the first pipe is fully crimped, wherein the inner annular groove is smaller when the first pipe is in the second configuration relative to when the first pipe is in the first configuration;
a second pipe having an insertion end configured to be slidably received at least partially into the open receiving end of the first pipe; and
a seal member disposed in the inner annular groove and including a ring-shaped body having an outer diameter and an inner diameter, the ring-shaped body further comprising a plurality of protrusions formed on the ring-shaped body and extending radially outwardly from the outer diameter, wherein a plurality of fluid passages are formed between adjacent protrusions of the plurality of protrusions, the first pipe, and the outer diameter of the ring-shaped body when the first pipe is in the first configuration, and wherein the plurality of fluid passages are closed when the first pipe is in the second configuration.

13. The crimped connection of claim 12 wherein the inner diameter defines a consistent radius.

14. The crimped connection of claim 13 wherein the plurality of protrusions are generally trapezoidal in axial cross-section.

15. The crimped connection of claim 12 wherein the plurality of protrusions are generally hemispherical.

16. The crimped connection of claim 15 wherein the ring-shaped body has a radial cross-section and a protrusion of the plurality of protrusions has a radial height wherein a ratio of the radial height and the radial cross-section is substantially about 0.108.

17. The crimped connection of claim 12 wherein the plurality of protrusions comprise nubs.

18. The crimped connection of claim 12 wherein the plurality of protrusions are equally spaced around the outer diameter of the ring-shaped body.

19. The crimped connection of claim 12 wherein the ring-shaped body is formed of elastomeric material.

20. The crimped connection of claim 12 wherein the plurality of fluid passages formed by the plurality of protrusions are disposed along a fluid flow path that extends between the first pipe and the second pipe and permit fluid flow through the inner annular groove and past the seal member when the first pipe is in the first configuration in order to provide an indication that the first pipe is not fully crimped.

\* \* \* \* \*